Patented Dec. 30, 1941

2,268,410

UNITED STATES PATENT OFFICE 2,268,410

CONDENSATION PRODUCTS

Eugene Lieber, West New Brighton, Staten Island, N. Y., assignor to Standard Oil Development Company, a corporation of Delaware No Drawing. Application November 16, 1939, Serial No. 304,781

8 Claims. (Cl. 252—55)

This invention relates to improved condensation products and more particularly to novel wax-modifying agents especially useful as pour depressors, and to methods of preparing same.

It is known that certain alkyl aryl ketones which might also be called fatty acid keto aromatics, such as stearo-phenone, have some pour depressing properties when added to lubricating oil; i. e., they have some tendency to reduce the pour point of the lubricating oil as determined by the standard A. S. T. M. method. However, these materials are relatively weak and ineffective.

It has now been found, and is a primary object of the present invention, that the pour depressant potency of such materials can be very greatly improved by condensation with a low molecular weight acyl halide, such as, acetyl chloride. It has also been found, and is a further object of this invention, that the resultant di-acylated product can be made directly in one operation by acylating a suitable aromatic compound, such as benzene, naphthalene, etc., with a mixture comprising two different acyl halides, one of which is of high molecular weight, having preferably above 15 carbon atoms, while the other is of low molecular, not higher than 10 carbon atoms and preferably not higher than 7 carbon atoms, for example, a mixture of stearyl chloride and acetyl chloride.

One example of a method of carrying out the present invention is to condense 1 mol of stearo-phenone (prepared by condensing stearyl chloride with benzene) with 1 mol of acetyl chloride in the presence of aluminum chloride, the resulting acetyl stearo-phenone is isolated and is found to be a potent pour depressor. An alternative method of preparing the acetyl stearo-phenone is to react 1 mol of benzene with a mixture consisting of 1 mol of stearyl chloride and 1 mol of acetyl chloride, in the presence of aluminum chloride. Although it is not known with certainty, it is believed that the chemical reaction involved in the present invention may be represented by the following chemical equations:

METHOD A

Equation 1

RCOCl+Ar→RCOAr where R is an alkyl group having more than 10 carbon atoms and Ar is an aromatic nucleus, such as benzene, naphthalene, etc. 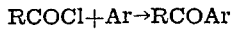

Equation 2

RCOAr+R'COCl→RCOArCOR' 

in which R' is an alkyl group having less than 10 carbon atoms.

ALTERNATIVE METHOD B

Equation 3

$$\begin{matrix}(RCOCl)\\(R'COCl)\end{matrix} + Ar \rightarrow RCOArCOR'$$ 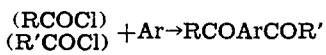

For these reactions R should be an alkyl group having at least 10 carbon atoms, and it is preferred that R be an alkyl group having at least 15 carbon atoms such as obtainable in the fatty acids derived by oxidation of paraffin wax, or in fatty acids such as stearic, palmitic, oleic, cerotic, montanic, behemic, etc. obtainable from animal and vegetable fats. The aromatic group Ar should preferably have not more than 3 nuclei and may comprise benzene, naphthalene, anthracene, phenanthrene, diphenyl, and the like or mixtures thereof, although substituted aromatic hydrocarbons having a substituent of such a nature as not to interfere with the Friedel-Craft catalyst, i. e. remaining inert during the Friedel-Craft condensation, may be used, e. g., alkyl, aralkyl, isocyclyl (e. g. cyclohexyl), halogen, alkoxy, aroxy groups and perhaps hydroxy— but not carboxyl, carbalkoxy, nitro, cyano, etc., R' is preferably an alkyl group having less than 6 carbon atoms such as in the groups: caproyl, valeryl and butyryl, and still better, less than 3 carbon atoms, such as in the acetyl and propionyl groups.

Equations 1, 2 and 3 involving the condensation of 1 or more acyl halides on an aromatic nucleus are preferably carried out in the presence of a suitable Friedel-Craft type catalyst, such as aluminum chloride; other catalysts include boron fluoride, zinc chloride, iron chloride, titanium tetrachloride, boron chloride and even anhydrous hydrogen fluoride.

The reaction is also preferably carried out in the presence of a suitable inert solvent or a diluent, such as a kerosene or naphtha which has been highly refined by treating with strong sulfuric acid or aluminum chloride. Other solvents include tetrachlorethane, dichlorbenzene, carbon disulfide, nitrobenzene, and the like, or mixtures of any of these.

Reaction usually takes place at room temperature and is preferably allowed to proceed at room temperature until the vigor of the reaction begins to subside, at which time the reaction liquid is gradually heated to a suitable temperature such as about 220° F. and kept there for a suitable length of time, such as a half hour or an hour or more. After decomposing the catalyst as by an addition of an alcohol-water mixture, any solvent or diluent and low boiling products, or residual raw materials, are preferably removed by distillation with fire and steam in which the temperature is raised to about 600° F.

Although it is believed preferable to use 1 mol of the low molecular weight acyl group for 1 mol of aromatic nucleus and 1 mol of high molecular weight acyl group, nevertheless some satisfactory results have been obtained with as little as ½ a mol of low molecular weight acyl groups to 1 mol of each of the other two groups.

The products of the present invention are potent pour depressors and are therefore particularly suited for addition in small amounts, such as .02% to 10% or preferably 0.1% to about 3%, to waxy lubricating oils such as those derived from Pennsylvania type crude oils or other oils rich in paraffinic-type hydrocarbons.

The product of the present invention is also useful as a wax-modifying agent for other purposes, such as an aid for settling, filtering and centrifuging paraffin wax out of compositions containing same, particularly in the presence of a relatively large amount of volatile diluents; and this novel wax-modifying agent is also useful for modifying the texture of paraffin wax or other wax used in coating paper, etc.

The results obtained by the present invention are highly unexpected because the use of very low molecular weight acyl groups, such as the acetyl group, is directly contrary to all the teachings of the prior art.

The invention will be still better understood from the following experimental data.

Example 1

Twenty-four grams of acetyl chloride (1 mol) were dissolved in 24 grams of benzene (1 mol). To this was added one molar proportion of stearyl chloride prepared by treating 87 grams of stearic acid with 35 grams of $PCl_3$. Eighty grams of $AlCl_3$ was slowly added with suitable agitation. After the addition of the $AlCl_3$, the reaction mixture was heated to 200° F. and maintained thereat for 3 hours. At the end of this time, the reaction mixture was cooled, diluted with kerosene, and neutralized with a mixture of alcohol and water. After settling, the kerosene extract was distilled with fire and steam to 600° F. in order to remove solvent and low boiling products. A bottoms residue comprising 65 grams of a very viscous green oil was obtained as products. Although the exact structure of the product is not known with certainty, it is believed to be essentially an acetylated stearyl benzene.

Other tests were carried out in a similar manner except with variations as to the solvent used, the aromatic nucleus used, and the acyl group used, and the pour depressor potencies of the product were tested by blending in a waxy oil having a pour point of +30° F., the pour point being tested by the standard A. S. T. M. procedure. The results of these various tests are summarized in the following table:

Table

Pour depressing properties of compounds having the general formula

R—CO—Ar—CO—R' in which R represents an alkyl group having more than 10 carbon atoms,
Ar is an aromatic group, and
R' is an alkyl group having not more than 10 carbon atoms.

WEIGHT (G) OF MATERIALS USED

| | R acyl chloride | | R' acetyl chloride | | Solvent | AlCl₃ g. | Yield g. | Color | Product | Pour point (°F.)** |
|---|---|---|---|---|---|---|---|---|---|---|
| | Type | g. | g. | Mol. | | | | | | |
| Ar=24 g. benzene=1 mol. | | | | | | | | | | |
| 1 | Stearyl | 87 | 24 | 1 | None | 80 | 65 | Green | Oil | −10 |
| 2 | ---do--- | 87 | 24 | 1 | Kerosene | 80 | 98 | ---do--- | ---do--- | 0 |
| 3 | ---do--- | 87 | 24 | 1 | C₂H₂Cl₄ | 80 | 38 | Brown | Tacky resin | −15 |
| 4 | Wax-acid* | 87 | 12 | ½ | Kerosene | 40 | 55 | ---do--- | Oil | −15 |
| Ar=52 g. naphthalene=1 mol. | | | | | | | | | | |
| 5 | Stearyl | 87 | 32 | 1 | C₂H₂Cl₄ | | 72 | Brown | Oil | −15 |

*Wax-acid chloride made by treating with $PCl_3$ the fatty acids obtained from oxidation of paraffin wax.
**Figures show pour point of blend of 2% of product in waxy oil having a pour point of +30° F.

The results in the above table show that the products of this invention when added in amounts of 2% to a waxy-lubricating oil having a pour point of 30° F. effected a reduction in the pour point ranging from 30 to 45° F.

For the sake of comparison, some additional tests were made in which an aromatic nucleus such as benzene or naphthalene, was condensed with two mols of a high molecular weight acyl halide instead of one high molecular weight one and one low molecular weight one according to the present invention. The results in all cases were definitely inferior to those obtained according to the present invention under comparable conditions. For comparison with examples 1, 2 and 3, two mols of stearyl chloride were reacted with one mol of benzene, and 2% of the resultant distearyl benzene when blended with the same waxy lubricating oil used in tests 1 to 5, gave a pour point of +20° F., whereas the product of the present invention in examples 1, 2 and 3, reduced the pour point to −10, 0 and −15° F. respectively. Similarly, 2% of a di-waxed ketone of benzene (reaction product of two mols of a paraffin wax fatty acid and 1 mol of benzene) gave a pour point of only 0° F. compared to the −15° F. obtained in Example 4 with acetylated wax ketone of benzene. Di-stearylated naphthalene (made for comparison with Example 5) failed to have any pour point reducing effect whatsoever.

It is not intended that this invention be limited to any of the specific examples which have been given for the sake of illustration only, nor to any theory as to the mechanism of the operation of the invention, but only by the appended claims in which it is intended to claim all novelty inherent in the invention as broadly as the prior art permits.

I claim:

1. A lubricant comprising a major proportion of a lubricating oil base stock and a small amount of a wax-modifying agent comprising essentially a compound having this general formula: R—CO—Ar—CO—R' in which R is an alkyl group having at least 10 carbon atoms, Ar is an aromatic hydrocarbon group and R' is an alkyl group having less than 10 carbon atoms.

2. A lubricant comprising a major proportion of a waxy hydrocarbon oil, and about 0.1% to 10% of a pour depressor comprising essentially a compound having the general formula: R—CO—Ar—CO—R' in which R is an alkyl group having at least 15 carbon atoms, Ar is an aromatic hydrocarbon group, and R' is an alkyl group having less than 6 carbon atoms.

3. A composition comprising a major proportion of a hydrocarbon oil and a minor proportion of an organic compound containing at least one aromatic nucleus having attached thereto an acyl group having not more than 10 carbon atoms, said compound being also at least partially acylated with an acyl group having not more than 10 carbon atoms.

4. A lubricant comprising a major proportion of a waxy mineral lubricating oil and small amount of a pour depressor comprising essentially a stearylated aromatic hydrocarbon at least partially acylated with an acyl group having not more than 3 carbon atoms.

5. A lubricant comprising a major proportion of a waxy mineral lubricating oil and about 0.1–10% of a pour depressor comprising essentially acetyl stearyl naphthalene.

6. A lubricant comprising a major proportion of waxy mineral lubricating oil and a small amount of a pour depressor comprising essentially a diacylated aromatic hydrocarbon in which 1 acyl group is derived from fatty acids obtained by oxidation of paraffin wax and the other acyl group is derived from fatty acids having not more than 3 carbon atoms.

7. The process of preparing lubricants which comprises incorporating into a major proportion of waxy mineral lubricating oil, a small amount of a product made by reacting an aromatic hydrocarbon with a mixture of acyl halides, at least one of which has more than 10 carbon atoms and at least one of which has not more than 10 carbon atoms.

8. The method of preparing lubricants which comprises incorporating into a compound of the formula R—CO—Ar in which R is an alkyl group having at least 10 carbon atoms and Ar is an aromatic hydrocarbon group, at least part of a molar amount of the group R'CO in which R' has less than 10 carbon atoms, and adding a small amount of the resultant product to a waxy mineral lubricating oil.

EUGENE LIEBER.